(12) United States Patent
Kandel et al.

(10) Patent No.: US 10,894,925 B2
(45) Date of Patent: Jan. 19, 2021

(54) MULTISTAGE UPGRADING HYDROCARBON PYROLYSIS TAR

(71) Applicant: ExxonMobil Chemical Patents Inc., Baytown, TX (US)

(72) Inventors: Kapil Kandel, Humble, TX (US); Bryan A. Patel, Jersey City, NJ (US); Sumathy Raman, Annandale, NJ (US); John S. Coleman, Houston, TX (US); Reyyan Koc-Karabocek, Houston, TX (US); Teng Xu, Houston, TX (US); Cyrus J. Rachal, Webster, TX (US); Subramanya V. Nayak, Buffalo Grove, IL (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 7 days.

(21) Appl. No.: 16/025,736

(22) Filed: Jul. 2, 2018

(65) Prior Publication Data

US 2019/0016969 A1 Jan. 17, 2019

Related U.S. Application Data

(60) Provisional application No. 62/532,575, filed on Jul. 14, 2017, provisional application No. 62/532,552, filed on Jul. 14, 2017.

(51) Int. Cl.
*C10G 69/06* (2006.01)
*C10G 65/12* (2006.01)
(Continued)

(52) U.S. Cl.
CPC .............. *C10G 69/06* (2013.01); *C10G 65/02* (2013.01); *C10G 65/10* (2013.01); *C10G 65/12* (2013.01); *C10G 67/02* (2013.01); *B01J 23/28* (2013.01); *B01J 23/44* (2013.01); *B01J 23/745* (2013.01); *B01J 23/75* (2013.01); *B01J 23/755* (2013.01); *C10G 2300/206* (2013.01); *C10G 2300/207* (2013.01); *C10G 2300/301* (2013.01);
(Continued)

(58) Field of Classification Search
CPC ........ C10G 69/06; C10G 67/02; C10G 65/02; C10G 65/10; C10G 65/12; C10G 2300/4018; C10G 2300/206; C10G 2300/802; C10G 2300/4006; C10G 2300/302; C10G 2300/301; C10G 2300/207
See application file for complete search history.

(56) References Cited

U.S. PATENT DOCUMENTS 5,871,634 A 2/1999 Wiehe et al.
6,454,932 B1 * 9/2002 Baldassari ............. C10G 65/10
208/153

(Continued)

OTHER PUBLICATIONS

U.S. Appl. No. 62/380,538, filed Aug. 29, 2016.

*Primary Examiner* — Renee Robinson (57) ABSTRACT

A multi-stage process for upgrading tars is provided. A predominantly hydrotreating stage can be applied before a cracking stage, which can be a hydrocracking or a thermal cracking stage. Alternatively, a predominantly cracking stage, which can be a hydrocracking or a thermal cracking stage, can be applied before a hydrotreating stage. Apparatus suitable for performing the method is also provided.

25 Claims, 5 Drawing Sheets

(51) Int. Cl.
  *C10G 65/02* (2006.01)
  *C10G 65/10* (2006.01)
  *C10G 67/02* (2006.01)
  *B01J 23/28* (2006.01)
  *B01J 23/44* (2006.01)
  *B01J 23/745* (2006.01)
  *B01J 23/75* (2006.01)
  *B01J 23/755* (2006.01)

(52) U.S. Cl.
  CPC .......... *C10G 2300/302* (2013.01); *C10G 2300/4006* (2013.01); *C10G 2300/4018* (2013.01); *C10G 2300/802* (2013.01)

(56) References Cited

U.S. PATENT DOCUMENTS

| | | | |
|---|---|---|---|
| 9,090,835 B2 | 7/2015 | Beech, Jr. et al. | |
| 9,090,836 B2 | 7/2015 | Brown et al. | |
| 9,102,884 B2 | 8/2015 | Xu et al. | |
| 9,580,523 B2 | 2/2017 | Wong et al. | |
| 9,637,694 B2 | 5/2017 | Evans et al. | |
| 9,657,239 B2 | 5/2017 | Beech, Jr. et al. | |
| 2012/0261307 A1* | 10/2012 | Joseck | C10G 65/043 208/58 |
| 2013/0081979 A1 | 4/2013 | Brown et al. | |
| 2014/0061094 A1 | 3/2014 | Xu et al. | |
| 2014/0061095 A1* | 3/2014 | Beech, Jr. | C10G 69/06 208/73 |
| 2014/0061096 A1* | 3/2014 | Brown | C10G 69/06 208/73 |
| 2014/0061100 A1 | 3/2014 | Lattner et al. | |
| 2014/0174980 A1 | 6/2014 | Brown et al. | |
| 2015/0141717 A1 | 5/2015 | Frey et al. | |
| 2015/0315496 A1 | 11/2015 | Soultanidis et al. | |
| 2015/0344785 A1 | 12/2015 | Soultanidis et al. | |
| 2015/0344790 A1 | 12/2015 | Ferrughelli et al. | |
| 2015/0361354 A1 | 12/2015 | Xu et al. | |
| 2015/0361359 A1 | 12/2015 | Beech, Jr. et al. | |
| 2016/0115399 A1* | 4/2016 | Banerjee | C10G 45/02 208/57 |
| 2016/0122667 A1* | 5/2016 | Evans | C10G 9/36 208/70 |
| 2016/0177205 A1 | 6/2016 | Evans et al. | |
| 2017/0002273 A1 | 1/2017 | Rubin-Pitel et al. | |

\* cited by examiner

MULTISTAGE UPGRADING HYDROCARBON PYROLYSIS TAR

PRIORITY

This application claims priority to and the benefit of U.S. Provisional Patent Application No. 62/532,575, filed Jul. 14, 2017, and U.S. Provisional Patent Application No. 62/532,552, filed Jul. 14, 2017; which are incorporated herein by reference herein in their entireties.

FIELD OF THE INVENTION

The invention relates to pyrolysis tar upgrading, e.g., to processes for upgrading pyrolysis tar, to apparatus useful for carrying out such processes, to upgraded pyrolysis tar, and to the use of upgraded pyrolysis tar, e.g., as one or more of a low sulfur fuel oil product, a distillate boiling-range product, and a blendstock for producing such products.

BACKGROUND OF THE INVENTION

Pyrolysis processes, such as steam cracking, are utilized for converting saturated hydrocarbons to higher-value products such as light olefins, e.g., ethylene and propylene. Besides these useful products, hydrocarbon pyrolysis can also produce a significant amount of relatively low-value heavy products, such as pyrolysis tar. When the pyrolysis is steam cracking, the pyrolysis tar is identified as steam-cracker tar ("SCT").

Pyrolysis tar is a high-boiling, viscous, reactive material comprising complex, ringed and branched molecules that can polymerize and foul equipment. Pyrolysis tar also contains high molecular weight non-volatile components including paraffin insoluble compounds, such as pentane insoluble compounds and heptane-insoluble compounds. Particularly challenging pyrolysis tars contain >0.5 wt. %, sometimes >1.0 wt. % or even >2.0 wt. %, of toluene insoluble compounds. The high molecular weight compounds are typically multi-ring structures that are also referred to as tar heavies ("TH"). These high molecular weight molecules can be generated during the pyrolysis process, and their high molecular weight leads to high viscosity which limits desirable pyrolysis tar disposition options. For example, it is desirable to find higher-value uses for SCT, such as for fluxing with heavy hydrocarbons, especially heavy hydrocarbons of relatively high viscosity. It is also desirable to be able to blend SCT with one or more heavy oils, examples of which include bunker fuel, burner oil, heavy fuel oil (e.g., No. 5 or No. 6 fuel oil), high-sulfur fuel oil, low-sulfur oil, regular-sulfur fuel oil ("RSFO"), Emission Controlled Area fuel (ECA) with <0.1 wt. % sulfur and the like.

One difficulty encountered when blending heavy hydrocarbons is fouling that results from precipitation of high molecular weight molecules, such as asphaltenes. In order to mitigate asphaltene precipitation, an Insolubility Number, $I_N$, and a Solvent Blend Number, SBN, are determined for each blend component by the method outlined in U.S. Pat. No. 5,871,634, incorporated entirely herein by reference. Successful blending is accomplished with little or substantially no precipitation by combining the components in order of decreasing SBN, so that the SBN of the blend is greater than the $I_N$ of any component of the blend. Pyrolysis tars generally have high SBN>135 and high $I_N$>80 making them difficult to blend with other heavy hydrocarbons. Pyrolysis tars having $I_N$>100, e.g., >110 or >130, are particularly difficult to blend without phase separation.

Attempts at pyrolysis tar hydroprocessing to reduce viscosity and improve both $I_N$ and SBN have not led to a commercializable process, primarily because fouling of process equipment could not be substantially mitigated. For example, neat SCT hydroprocessing results in rapid catalyst coking when the hydroprocessing is carried out at a temperature in the range of about 250° C. to 380° C. and a pressure in the range of about 5400 kPa to 20,500 kPa, using a conventional hydroprocessing catalyst containing one or more of Co, Ni, or Mo. This coking has been attributed to the presence of TH in the SCT that leads to the formation of undesirable deposits (e.g., coke deposits) on the hydroprocessing catalyst and the reactor internals. As the amount of these deposits increases, the yield of the desired upgraded pyrolysis tar (upgraded SCT) decreases and the yield of undesirable byproducts increases. The hydroprocessing reactor pressure drop also increases, often to a point where the reactor is inoperable.

Additionally it is desirable to upgrade pyrolysis tar to a product having more valuable distillate range molecules. However, upgrading pyrolysis tar to even lower boiling molecules suffers from the same or more difficulties.

One approach taken to overcome these difficulties is disclosed in U.S. Pat. No. 9,102,884, which is incorporated herein by reference in its entirety. This reference discloses hydroprocessing SCT in the presence of a utility fluid comprising a significant amount of single and multi-ring aromatics to form an upgraded pyrolysis tar product. The upgraded pyrolysis tar product generally has a decreased viscosity, decreased atmospheric boiling point range, increased density and increased hydrogen content over that of the SCT feedstock, resulting in improved compatibility with fuel oil and blend-stocks. Additionally, efficiency advances involving recycling a portion of the upgraded pyrolysis tar product as utility fluid are described in U.S. Patent Application Publication No. 2014/0061096, incorporated herein by reference in its entirety.

U.S. Published Patent Application No. 2015/0315496, which is incorporated herein by reference in its entirety, describes separating and recycling a mid-cut utility fluid from the upgraded pyrolysis tar product. The utility fluid comprises ≥10.0 wt. % aromatic and non-aromatic ring compounds and each of the following: (a) ≥1.0 wt. % of 1.0 ring class compounds; (b) ≥5.0 wt. % of 1.5 ring class compounds; (c) ≥5.0 wt. % of 2.0 ring class compounds; and (d) ≥0.1 wt. % of 5.0 ring class compounds.

U.S. Pat. No. 9,657,239, which is incorporated herein by reference in its entirety, describes separating and recycling a utility fluid from the upgraded pyrolysis tar product. The utility fluid contains 1-ring and/or 2-ring aromatics and has a final boiling point ≤430° C.

U.S. Pat. No. 9,637,694, which is incorporated herein by reference in its entirety, describes a process for upgrading pyrolysis tar, such as steam cracker tar, in the presence of a utility fluid which contains 2-ring and/or 3-ring aromatics and has solubility blending number $(S_{BN})$≥120.

U.S. Patent Application No. 62/380,538 filed Aug. 29, 2016 which is incorporated herein entirely describes hydroprocessing conditions at higher pressure >8 MPa and a lower weight hourly space velocity of combined pyrolysis tar and utility fluid as low as 0.3 hr$^{-1}$.

Other references of interest include U.S. Pat. Nos. 9,580,523; 9,090,836; 9,090,835; U.S. Patent Application Publication Nos. 2013/0081979; 2014/0061100; 2014/0174980; 2015/0344790; 2015/0344785; 2015/0361354; 2015/0361359; and 2016/0177205.

Despite these advances, there remains a need for further improvements in the hydroprocessing of tars, especially those having high $I_N$ values, which allow the production of upgraded tar product having lower viscosity and density specifications without compromising the lifetime of the hydroprocessing reactor. Additionally, upgraded tar product is desired having more distillate boiling range molecules.

SUMMARY OF THE INVENTION

It has been discovered that the viscosity and density of the upgraded tar product can be lowered sufficiently when the tar processing tars is carried out in at least two processing zones. It has been found that processing in at least two zones beneficially results in a desirable product (e.g., processed tar, such as hydroprocessed tar), under milder conditions than would otherwise be needed to produce a processed tar of substantially similar properties in one processing zone. For example, when processing in two processing zones, a processed tar of desirable properties can be produced even when the total pressure is ≤8 MPa and the weight hour space velocity (WHSV) is ≥0.5 hr$^{-1}$. Advantageously, this allows for lower facility cost due to lower design pressure of equipment and for improved process reliability. Improved reliability includes less destruction of desirable utility fluid solvent molecules and longer runtimes between need for catalyst regeneration or replacement.

It has been still further discovered that the process conditions of each zone can be adjusted based on the characteristics of the tar to achieve the desired product quality. This discovery has led to the development of tar upgrading processes utilizing at least two different reactor configurations.

Accordingly, certain aspects of the invention relate to a hydrocarbon conversion process, comprising several steps. First, a feedstock is provided, which comprises i) ≥10.0 wt. % pyrolysis tar hydrocarbon based on the weight of the feedstock and ii) a utility fluid comprising aromatic hydrocarbons and having an ASTM D86 10% distillation point >60° C. and a 90% distillation point <425° C. The pyrolysis tar has an $I_N$≥100 and viscosity measured at 50° C. of ≥10,000 cSt. The feedstock is hydroprocessed in at least two hydroprocessing zones in the presence of a treat gas comprising molecular hydrogen under catalytic hydroprocessing conditions to produce a hydroprocessed product, comprising hydroprocessed tar. The hydroprocessing conditions are such that in a first hydroprocessing zone a catalyst is used that promotes predominantly a hydrotreating reaction and in a second hydroprocessing zone a catalyst is used that promotes predominantly a hydrocracking reaction.

The invention also relates to a hydrocarbon conversion process, comprising several steps. First, a feedstock is provided, which comprises i) ≥10.0 wt. % pyrolysis tar hydrocarbon based on the weight of the feedstock and ii) a utility fluid comprising aromatic hydrocarbons and having an ASTM D86 10% distillation point >60° C. and a 90% distillation point <425° C. The pyrolysis tar has an $I_N$<105 and viscosity measured at 50° C. of <15,000 cSt. The feedstock is hydroprocessed in at least two hydroprocessing zones in the presence of a treat gas comprising molecular hydrogen under catalytic hydroprocessing conditions to produce a hydroprocessed product, comprising hydroprocessed tar. The hydroprocessing conditions are such that in a first hydroprocessing zone a catalyst is used that promotes predominantly a hydrocracking reaction and in a second hydroprocessing zone a catalyst is used that promotes predominantly a hydrotreating reaction.

DETAILED DESCRIPTION

Certain aspects of the invention will be described in terms of a hydrocarbon conversion process (a solvent assisted tar conversion, or "SATC" process) in which a feedstock comprising ≥10.0 wt. % pyrolysis tar hydrocarbon and a utility fluid comprising aromatic hydrocarbons is hydroprocessed in at least two hydroprocessing zones in the presence of a treat gas comprising molecular hydrogen under catalytic hydroprocessing conditions to produce a hydroprocessed product. The process may be operated at different temperatures in the at least two hydroprocessing zones. Additionally, or alternatively, inclusion of one or more steps for stripping sulfur from the first hydroprocessing product allows the advantageous use of catalysts that are sulfur sensitive for the second of two hydroprocessing steps to provide a greatly upgraded liquid product from the input tar. The invention is not limited to these aspects, and this description is not meant to foreclose other aspects within the broader scope of the invention, such as those which include thermal (e.g., non-catalytic) cracking of at least a portion of the pyrolysis tar hydrocarbon as the predominant reaction in at least one of the processing zones.

In general, the at least two stage process can be run at lower pressure and/or higher weight hour space velocity (WHSV) than a single stage while achieving similar or superior hydrogen penetration to upgrade the pyrolysis tar. The Examples below include exemplary configurations of the process and apparatus for implementing the processes. These configurations demonstrate advantages of a two hydroprocessing zone process that are at least one of i) that a higher degree of penetration of input hydrogen into the desired hydroprocessing product is obtained at a lower operating pressure and higher space velocity and ii) a lessening or prevention of saturation of the solvent (utility fluid) molecules which extends run length. Run length is believed to be extended by mitigating at least two fouling causes: 1) lowered solvent SBN leading to precipitation of asphaltenes due to incompatibility and 2) catalyst deactivation, most likely via accumulation of carbonaceous deposits.

A Solvent Assisted Tar Conversion (SATC) process is designed to convert tar, which may be a steam cracked tar or result from another pyrolysis process, into lighter products similar to fuel oil. In some cases, it is desirable to further upgrade the tar to have more molecule s boiling in the distillate range. SATC is proven to be effective for drastic viscosity reduction from as high as 500,000 to 15 cSt @ 50° C. with more than 90% sulfur conversion The SATC reaction mechanism and kinetics are not straightforward due to the complex nature of tar, and due to the incompatibility phenomenon. The most significant reactions are thermal cracking, hydrogenation, and desulfurization reactions. The thermodynamics and the required process conditions for these reactions can be very different, especially for thermal cracking and hydrogenation reactions Achieving the target hydrotreated tar product quality in a single fixed bed reactor is very difficult due to the aforementioned differences in the nature of the reactions taking place in the SATC process. Moreover, if the reaction conditions are not selected properly, the SATC reactor can undergo premature plugging due to incompatibility. Unselective hydrogenation of molecules in the solvent range can reduce the solvency power of the feed and the precipitation of asphaltenes can occur when the difference between the solubility blend number and the insolubility number is reduced.

These problems are solved, at least in part, by promoting the two main reactions, cracking and hydrogenation, in two different reaction zones in series. The two different reaction zones are typically in two different reactors, but can be set up in two different parts of a single reactor. It will be appreciated that there can be more than two reaction zones provided there is at least one reaction zone where cracking predominates and at least one reaction zone where hydrotreating predominates.

Thermal cracking and curing the cracked bonds with mild hydrogenation can be performed in one reaction zone. Hydrogenation can be carried out in another reaction zone to pre-treat hard to convert tar samples (e.g., highly aromatic tar samples) or to boost the product quality, specifically to reduce the product density. In such an embodiment, product quality can be further improved to include more distillate boiling range molecules, further increasing the desirability and economic value of the product.

Even though cracking and hydrogenation reactions will take place in both reaction zones, the bulk of these two reactions will take place in separate reaction zones. Without being bound by any theory of the invention, it is believed that as a result, the solvency power of the liquid phase at reaction conditions will be high enough to keep the polar ashphaltenes molecules in solution at any instant during the whole reaction time.

The process enables the production of on spec SATC product (e.g., sulfur content 1.5 wt. % or less, e.g., 1.0 wt. % or less, or 0.5 wt. % or less, and product viscosity as low as 30 cSt @ 50° C. or less, preferably ≤20 cSt @ 50° C. or ≤15 cSt @ 50° C., and density ≤1.00 g/cm$^3$) from any type of tar, typically a steam cracked tar, for a sustainable duration of reactor life-time without plugging the reactor (e.g., 1 year or longer).

"Hydroprocessing" refers to reactions that convert hydrocarbons from one composition of molecules to another in reactions that utilize molecular hydrogen. Hydroprocessing includes both cracking and hydrotreating.

"Cracking" is a process in which input hydrocarbon molecules, which might or might not include some heteroatoms, are converted to product hydrocarbon molecules of lower molecular weight. Cracking encompasses both of "hydrocracking" in which hydrogen is included in the atmosphere contacting the reactants, and "thermal cracking," in which relatively high temperatures are used to drive reactions toward production of molecules at the low end of the molecular weight spectrum. Temperatures utilized in a hydrocracking process are typically lower than those used in a thermal cracking process. Cracking reactions may introduce unsaturated C—C bonds and increased aromaticity into a product compared to the hydrocarbon molecules input into the reaction. Desulfurization or deamination may also occur in cracking reactions. In "steam cracking" steam is included in the atmosphere of the cracking reaction.

"Hydrotreating" is a process in which bonds in a feedstock, typically unsaturated or aromatic carbon-carbon bonds in a hydrocarbon, are reduced by a hydrogenation reaction.

A first reaction "predominates" over a second reaction in a reaction zone when the rate of the first reaction under a selected set of conditions of reactant concentration, temperature and pressure is greater than the rate of the second reaction. For example, a first reaction predominates over a second reaction when the reaction rate of the first reaction is ≥1.1 times the rate of the second reaction, such as ≥1.1 times, or ≥1.5 times, or ≥2 times, or ≥5 times, or ≥10 times. Reaction rate of a reaction can be indicated by the amount of reactant conversion on a weight basis that occurs via that reaction. The term "predominates" can be applied to catalytic and non-catalytic (e.g., thermal) reactions, e.g., (i) a first (non-catalytic) reaction occurring in the same zone as a second (catalytic) reaction, and vice-versa, or (ii) first and second catalytic reactions occurring in a zone. A catalyst will "promote predominantly" one reaction over another, in the context of the present application favoring cracking over hydrotreating or vice-versa, if the rate of the one reaction under a selected set of conditions of reactant concentration, temperature and pressure is increased by inclusion of the catalyst by a greater amount than the rate of the other reaction is increased by the presence of the catalyst under the same selected conditions. Examples of catalysts that promote predominantly a cracking reaction are amorphous $Al_2O_3$ and/or $SiO_2$, zeolite Y (USY or VUSY), Co—Mo/$Al_2O_3$, Ni—Co—Mo/$Al_2O_3$, Pd/ASA-Zeolite Y.

An important criterion for selecting the catalysts is the pore size and their distribution. Since the tar feed consists of fairly large molecules, catalysts with large pore size are preferred, especially at reactor locations where the catalyst and feed first meet. As an example, catalysts with bi-modal pore system, having 150-250 Å pores with feeder pores of 250-1000 Å in the support are more favorable.

The hydrotreating catalysts usually include transition metal sulfides dispersed on high surface area supports. The structure of the typical hydrotreating catalysts is made of 3-15 wt. % Group VIB metal oxide and 2-8 wt. % Group VIII metal oxide and these catalysts are typically sulfided prior to use.

The prominent reaction types in a SATC process are hydrocracking, hydrodesulfurization, hydrodenitrogenation, thermal cracking, hydrogenation, and oligomerization reactions. It is very difficult to completely isolate these reactions from each other. However, the selectivity of one reaction over the others can be increased by the selection of appropriate catalyst and more importantly process conditions. For instance, a Ni—W—$Al_2O_3$ catalyst can be used in the reactor section where the hydrogenation rate is desired to be increased with the following process conditions: higher pressure, lower temperature and high enough space velocity to prevent over saturation of aromatics. The components of the typical catalyst which can be used in hydroprocessing reactions of the present process are listed in Table 1. Also, an example of catalyst and its relative reactivity towards the reaction types are given in Table 2.

TABLE 1

| Hydro-cracking (HDC) Dual function catalyst. Acidic for cracking and metallic for hydrogenation | Hydro-desulfurization (HDS) & Hydro-denitrogenation (HDN) |
|---|---|
| Metal: Cobalt, Nickel, Tungsten, Platinum, Palladium | Metal: A transition metal of its salt. Sulfides of Cobalt, Molybdenum, Nickel, Tungsten, Iron, Chromium, Vanadium, Palladium (Pd on zeolite support). $H_3PO_{34}$ |
| Support: Alumina, Amorphous silica-alumina, Crystalline Zeolite, Acid-treated clay | Support: Alumina, Silica, Silica-alumina, Kieselguhr, Magnesia |

TABLE 2

Reaction and Relative Reactivity[a] of the Common Hydrodesulfurization Catalyst

| Catalyst | Co—Mo—$Al_2O_3$ | Ni—Mo—$Al_2O_3$ | Ni—W—$Al_2O_3$ |
|---|---|---|---|
| Hydro-desulfurization (HDS) | xxxx | xxx | xx |
| Hydro-denitrogenation (HDN) | xx | xxx | xx |
| Aromatics Hydrogenation | x | xx | xxxx |

[a]Reactivities: x-fair xx-good xxx-very good xxxx-excellent

In most instances, the two main reactions, cracking (which may be either of hydrocracking or thermal cracking) and hydrogenation ("hydrotreating"), are promoted separately, that is, either of cracking or hydrogenation will predominate, in two different reaction zones in series.

In some instances, thermal cracking and curing the cracked bonds with hydrogen by mild hydrogenation in one reaction zone followed by additional hydrogenation performed in another reaction zone to lower viscosity. This approach is preferred when the pyrolysis tar has an $I_N$<105 and viscosity <15,000 cSt measured at 50° C., more preferred when the pyrolysis tar has an $I_N$<100 and viscosity <10,000 cSt measured at 50° C.

In some instances, hydrogenation can be carried out in one reaction zone followed by thermal cracking to boost the product quality, for example to reduce the product density. This approach is preferred to treat hard to convert tar samples (which are typically highly aromatic tar samples) having an $I_N$≥100 and viscosity ≥10,000 cSt measured at 50° C., more preferred when the pyrolysis tar has an $I_N$≥105 and viscosity ≥15,000 cSt measured at 50° C.

As mentioned, a predominantly cracking reaction may precede a predominantly hydrogenation reaction, or vice-versa.

A hydrocarbon conversion process may generally be one ("hydrotreating-cracking," "Ht-Cr") wherein the hydroprocessing conditions are such that in a first hydroprocessing zone a catalyst is used that promotes predominantly a hydrotreating reaction and in a second hydroprocessing zone a catalyst is used that promotes predominantly a hydrocracking reaction. When the process is run in the Ht-Cr configuration, the catalyst in the first hydroprocessing zone can be one that comprises one or more of Ni, Mo, W, Pd, and Pt, supported on amorphous $Al_2O_3$ and/or $SiO_2$ (ASA). Exemplary catalysts for use in a hydroprocessing zone, which hydroprocessing can be the first treatment applied to the feedstock tar, are a Ni—Co—Mo/$Al_2O_3$ type catalyst, or Pt—Pd/$Al_2O_3$—$SiO_2$, Ni—W/$Al_2O_3$, Ni—Mo/$Al_2O_3$, or Fe, Fe—Mo supported on a non-acidic support such as carbon black or carbon black composite, or Mo supported on a nonacidic support such as $TiO_2$ or $Al_2O_3$/$TiO_2$.

A guard bed followed by $H_2S$, $NH_3$ removal is needed if the S and N content of the feed is too high. A Co—Mo/$Al_2O_3$. The guard bed is not necessary when this catalyst is used in the second reactor because the S,N levels will already be reduced in the first reactor, the $NH_3$, $H_2S$ separation will still be applicable.

The catalyst in the second hydroprocessing zone can be one that comprises predominantly one or more of a zeolite or Co, Mo, P, Ni, Pd supported on ASA and/or zeolite. Exemplary catalysts for use in the second hydroprocessing zone are USY or VUSY Zeolite Y, Co—Mo/$Al_2O_3$, Ni—Co—Mo/$Al_2O_3$, Pd/ASA-Zeolite Y. The catalyst for each hydroprocessing zone maybe selected independently of the catalyst used in any other hydroprocessing zone; for example, RT-228 catalyst (a Ni—Co—Mo/$Al_2O_3$ catalyst) may be used in the first hydroprocessing zone, and RT-621 catalyst (a Co—Mo/$Al_2O_3$ catalyst) may be used in the second hydroprocessing zone.

When a zeolite catalyst is used in the first reactor, a guard bed followed by $H_2S$, $NH_3$ removal is needed if the S and N content of the feed is too high. The guard bed preferably includes an inexpensive and readily available catalyst such as Co—Mo/$Al_2O_3$.

The guard bed is not necessary when a zeolite catalyst is used in the second reactor because the sulfur and nitrogen levels will already be reduced in the first reactor. Steps for separating $NH_3$, $H_2S$ separation can still be applied to the products of both of the first hydroprocessing zone and the second hydroprocessing zone.

Independently, or in combination with any particular arrangement of the catalysts in the different hydroprocessing zones, the temperature in the first, hydrotreating zone of a Ht-Cr process can range from 200-425° C. and the temperature in the second cracking (which can be hydrocracking) zone can range from 350-425° C.

A hydrocarbon conversion process can also be generally arranged as one ("cracking-hydrotreating," "Cr-Ht") wherein the hydroprocessing conditions are such that in a first hydroprocessing zone a catalyst is used that promotes predominantly a hydrocracking reaction and in a second hydroprocessing zone a catalyst is used that promotes predominantly a hydrotreating reaction. When run in the Cr-Ht manner, the catalyst in the first hydroprocessing zone can be one that comprises predominantly one or more of a zeolite or Co, Mo, P, Ni, Pd supported on ASA and/or zeolite, and the catalyst in the second hydroprocessing zone can be one that comprises one or more of Ni, Mo, W, Pd, and Pt, supported on amorphous $Al_2O_3$ and/or $SiO_2$ (ASA). In this configuration, the exemplary catalysts for use in the first hydroprocessing zone are USY or VUSY Zeolite Y, Co—Mo/$Al_2O_3$, Ni—Co—Mo/$Al_2O_3$, Pd/ASA-Zeolite Y and exemplary catalysts for use in the second hydroprocessing zone are a Ni—Co—Mo/$Al_2O_3$ type catalyst, or Pt—Pd/$Al_2O_3$—$SiO_2$, Ni—W/$Al_2O_3$, Ni—Mo/$Al_2O_3$, or Fe, Fe—Mo supported on a non-acidic support such as carbon black or carbon black composite, or Mo supported on a nonacidic support such as $TiO_2$ or $Al_2O_3$/$TiO_2$. The catalyst for each hydroprocessing zone maybe selected independently of the catalyst used in any other hydroprocessing zone; for example, RT-621 catalyst may be used in the first hydroprocessing zone, and RT-228 catalyst may be used in the second hydroprocessing zone.

Independently of the catalyst chosen, or in combination with any of the catalysts chosen, a Cr-Ht process can be one in which the temperature in the first hydroprocessing zone ranges from 350-425° C. and the temperature in the second hydroprocessing zone ranges from 200-415° C. The temperature in the first hydroprocessing zone is generally higher than the temperature in the second hydroprocessing zone in a Cr-Ht configured process.

Independently, or in combination with any particular arrangement of the catalysts in the different hydroprocessing zones and/or their respective temperatures and/or pressures of operation, the utility fluid used can comprise ≥25% by weight of the utility fluid of ring aromatics and the utility fluid can have a SBN of ≥100.

Independently, or in combination with any particular arrangement of the catalysts in the different hydroprocessing zones and/or their respective temperatures of operation and/or the properties of the utility fluid selected for conducting the process, the feedstock tar can be a pyrolysis tar having a $I_N \geq 80$, SBN≥140, $C_7$ insolubles ≥15 wt. %, viscosity ≥680 cSt @ 50° C., sulfur content ≥0.5 wt. % and hydrogen wt. % from 6-8. In some instances, the feedstock tar may have an $I_N \geq 100$.

Independently, or in combination with any particular arrangement of the catalysts in the different hydroprocessing zones and/or their respective temperatures of operation, the utility fluid used in a Cr-Ht process can comprise ≥25% by weight of the utility fluid of ring aromatics and the utility fluid has a SBN of ≥100. Alternatively or additionally, the utility fluid may be characterized by its true initial and true final boiling points, which can independently be ≥100° C. and ≤430° C., respectively.

In any configuration of the process, the hydroprocessing conditions can comprise a pressure of from 1000-1800 psig. In any configuration of the process, the hydroprocessing conditions can comprise a pressure of from 800-1600 psig, or from 1000-1400 psig, or from 1000-1200 psig, or from 1100-1600 psig, or from 1100-1300 psig.

In any configuration of the process, hydrogen ("makeup hydrogen") can be added to a feed or quench at a rate sufficient to maintain a $H_2$ partial pressure of from 700 psig to 1500 psig in a hydroprocessing zone.

In any configuration of the process, the feedstock can comprise at least ≥20 wt. % tar hydrocarbon.

In any configuration of the process the catalyst promoting predominantly a hydrotreating reaction can comprise Ni and the pressure in the hydroprocessing zone for predominantly a hydrotreating reaction can be ≥2000 psig.

In any configuration of the process, the tar can comprise (i) ≥10.0 wt. % of molecules having an atmospheric boiling point ≥565° C. that are not asphaltenes, and (ii) ≤1.0×10³ ppmw metals. Such a tar can be a pyrolysis tar.

In any configuration of the process, (i) the hydrotreating is conducted continuously in the hydrotreating zone from a first time $t_1$ to a second time $t_2$, $t_2$ being ≥($t_1$+80 days) and (ii) the pressure drop in the hydrotreating zone at the second time increases ≤10.0% over the pressure drop at the first time.

Figure 1:
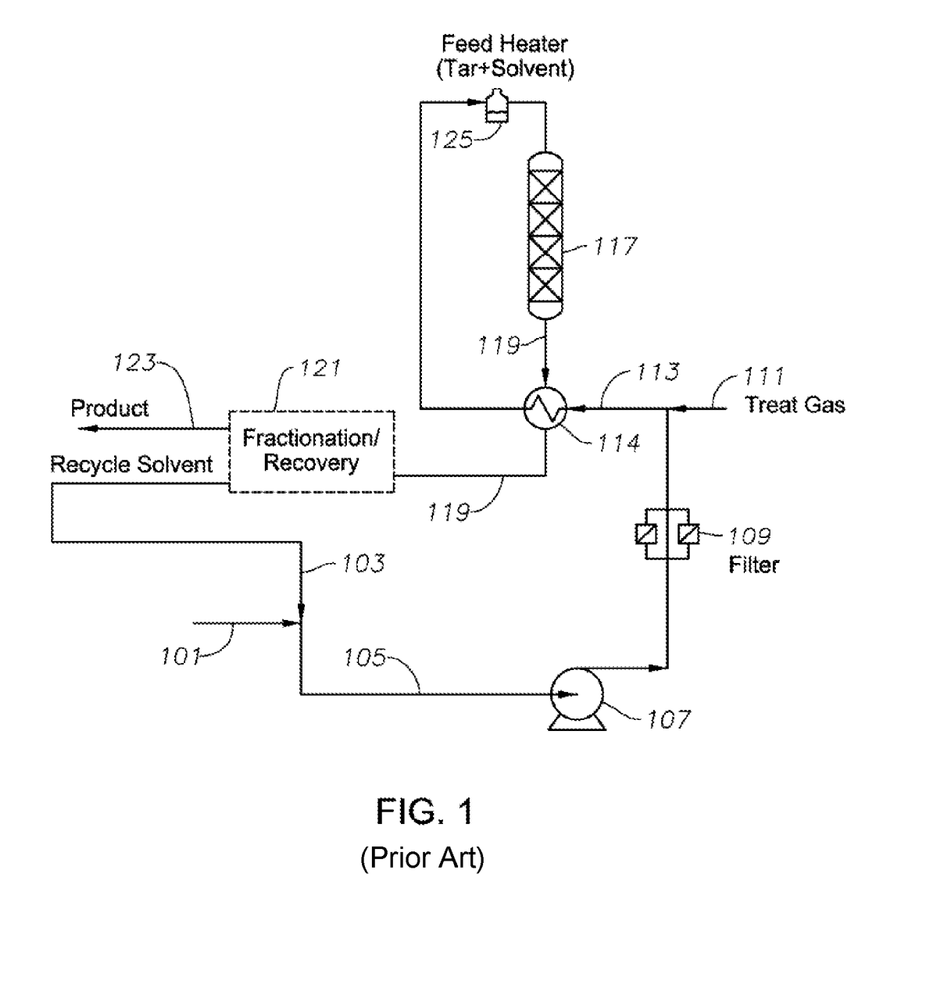
FIG. 1 is an illustration of a single reaction zone embodiment of the prior art.

FIG. 1 illustrates a comparative single stage reactor. In the apparatus shown, a pyrolysis tar 101 to be processed is blended with a recycle solvent 103 at line 105 operably connected to a pump 107 and filter 109 to obtain a feedstock. A treat gas 111 comprising molecular hydrogen is added to the feedstock at mixpoint 113 at a $H_2$:feed ratio of about 3000 scfb and the resultant mixture is passed through a heat exchanger 114 then through feed heater 115 to pre-heat the mixture. The pre-heated mixture is then fed into a single reactor 117 containing a typical hydrotreating catalyst and operating at 400-415° C. and 1800 psig for WHSV values as low as 0.3 hr⁻¹. The hydroprocessed effluent is conducted via 119 through feed/effluent exchanger 114 to separator 121. The liquid product 123 is withdrawn and recycle solvent 103 is recycled to be mixed with the pyrolysis tar feed 101.

Figure 2:
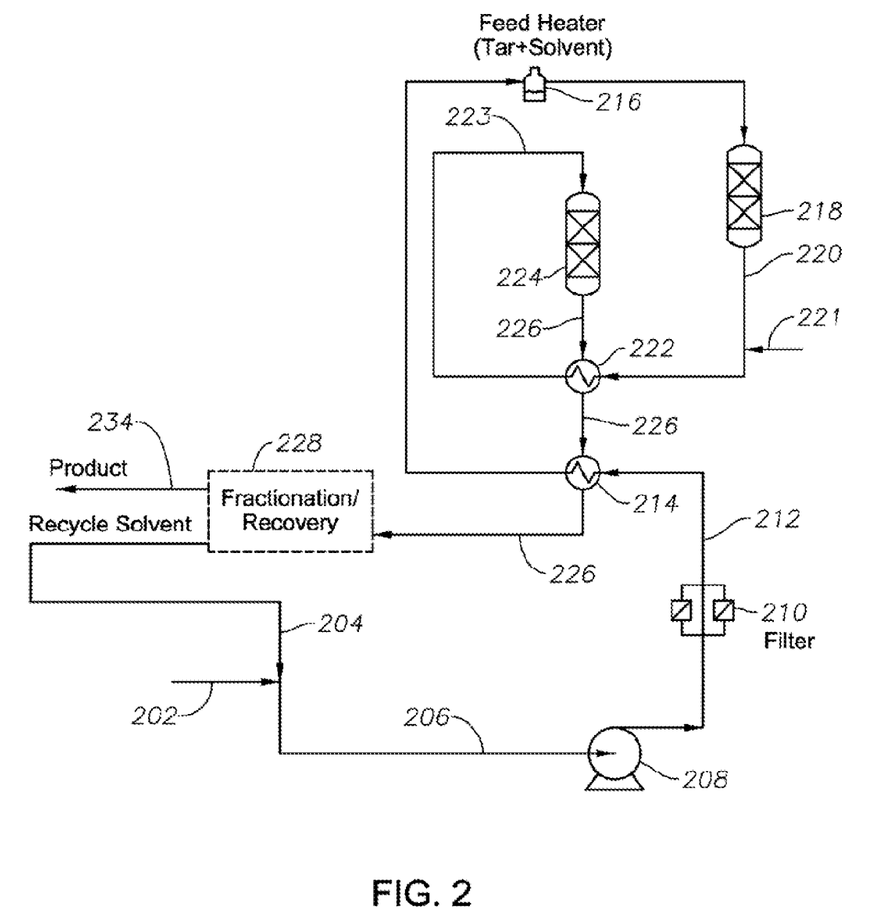
FIG. 2 is an illustration of one embodiment of the process and apparatus according to the invention involving hydroprocessing in at least two hydroprocessing zones.

FIG. 2 illustrates a process in the "Ht-Cr" configuration. In the apparatus shown, a tar 202 to be processed is blended with a "utility fluid" comprising a recycle solvent at line 206 operably connected to a pump 208 and filter 210 to obtain a feedstock 212.

The tar can be any tar, but is usually one having $I_N \geq 80$. The insolubility index of the tar can be IN≥85, $I_N \geq 90$, $I_N \geq 100$ $I_N \geq 110$, $I_N \geq 120$, $I_N \geq 130$ or $I_N \geq 135$. The tar can be a product of a pyrolysis process.

The solvent blend number (SBN) of the tar can be as low as SBN≥130, but is typically SBN≥140, SBN≥145, SBN≥150, SBN≥160, SBN≥170, SBN≥175 or even SBN≥180. In some instances the tar can be one having SBN≥200, SBN≥200, even SBN about 240.

The tar can include up to 50 wt. % of $C_7$ insolubles. Generally, the tar can have as much as 15 wt. % $C_7$ insolubles, or up to 25% $C_7$ insolubles, or up to 30 wt. % $C_7$ insolubles, or up to 45 wt. % $C_7$ insolubles. Thus, the tar may include from 15-50 wt. % $C_7$ insolubles or 30-50 wt. % $C_7$ insolubles.

A tar to which the process can be advantageously applied is a pyrolysis tar having $I_N$ 110-135, SBN 180-240 and $C_7$ insolubles content of 30-50 wt. %.

The feedstock will typically include ≥10.0 wt. % tar hydrocarbon based on the weight of the feedstock and can include ≥15.0 wt. %, ≥20.0 wt. %, ≥30.0 wt. % or up to about 50 wt. %.

Pyrolysis tar can be produced by exposing a hydrocarbon-containing feed to pyrolysis conditions in order to produce a pyrolysis effluent, the pyrolysis effluent being a mixture comprising unreacted feed, unsaturated hydrocarbon produced from the feed during the pyrolysis, and pyrolysis tar. For example, when a feed comprising ≥10.0 wt. % hydrocarbon, based on the weight of the feed, is subjected to pyrolysis, the pyrolysis effluent generally contains pyrolysis tar and ≥1.0 wt. % of $C_2$ unsaturates, based on the weight of the pyrolysis effluent. The pyrolysis tar generally comprises ≥90 wt. % of the pyrolysis effluent's molecules having an atmospheric boiling point of ≥290° C. Besides hydrocarbon, the feed to pyrolysis optionally further comprises diluent, e.g., one or more of nitrogen, water, etc. For example, the feed may further comprise ≥1.0 wt. % diluent based on the weight of the feed, such as ≥25.0 wt. %. When the diluent includes an appreciable amount of steam, the pyrolysis is referred to as steam cracking.

The tar can be a SCT-containing tar stream (the "tar stream") from the pyrolysis effluent. Such a tar stream typically contains ≥90.0 wt. % of SCT based on the weight of the tar stream, e.g., ≥95.0 wt. %, such as ≥99.0 wt. %, with the balance of the tar stream being particulates, for example. A pyrolysis effluent SCT generally comprises ≥10.0% (on a weight basis) of the pyrolysis effluent's TH.

A tar stream can be obtained, e.g., from an SCGO stream and/or a bottoms stream of a steam cracker's primary fractionator, from flash-drum bottoms (e.g., the bottoms of one or more flash drums located downstream of the pyrolysis furnace and upstream of the primary fractionator), or a combination thereof. For example, the tar stream can be a mixture of primary fractionator bottoms and tar knock-out drum bottoms.

In certain embodiments, a SCT comprises ≥50.0 wt. % of the pyrolysis effluent's TH based on the weight of the pyrolysis effluent's TH. For example, the SCT can comprise ≥90.0 wt. % of the pyrolysis effluent's TH based on the weight of the pyrolysis effluent's TH. The SCT can have, e.g., (i) a sulfur content in the range of 0.5 wt. % to 7.0 wt. %, based on the weight of the SCT; (ii) a TH content in the range of from 5.0 wt. % to 40.0 wt. %, based on the weight of the SCT; (iii) a density at 15° C. in the range of 1.01 g/cm$^3$ to 1.15 g/cm$^3$, e.g., in the range of 1.07 g/cm$^3$ to 1.15 g/cm$^3$; and (iv) a 50° C. viscosity in the range of 200 cSt to 1.0×10$^7$ cSt. The amount of olefin in a SCT is generally ≤10.0 wt. %, e.g., ≤5.0 wt. %, such as ≤2.0 wt. %, based on the weight of the SCT. More particularly, the amount of (i) vinyl aromatics in a SCT and/or (ii) aggregates in a SCT that incorporates vinyl aromatics is generally ≤5.0 wt. %, e.g., ≤3 wt. %, such as ≤2.0 wt. %, based on the weight of the SCT.

The utility fluid can be a defined solvent or can include a defined solvent, but is typically a recycle solvent that is taken off from a different process. The utility fluid can be all or partly a product of the present process, such as a mid-cut of the final product that is recycled back to the initial feed.

To the degree that a defined solvent is included in the utility fluid, or used alone, the defined solvent will comprise 1- and 2-ring aromatic molecules.

Generally, the utility fluid will include aromatic hydrocarbons and have an ASTM D86 10% distillation point >60° C. and a 90% distillation point <425° C. The amount of aromatic hydrocarbons in the utility fluid can be ≥25% by weight of the utility fluid. The solubility blending number of the utility fluid can be ≥120, ≥125, or ≥130.

When hydroprocessing pyrolysis tars having incompatibility number ($I_N$)>110, there can be benefit to the process if, after being combined, the utility fluid and tar mixture has a high solubility blending number (SBN)≥150, ≥155, or ≥160.

Generally, the utility fluid largely comprises a mixture of multi-ring compounds. The rings can be aromatic or non-aromatic and can contain a variety of substituents and/or heteroatoms. For example, the utility fluid can contain ≥40.0 wt. %, ≥45.0 wt. %, ≥50.0 wt. %, ≥55.0 wt. %, or ≥60.0 wt. %, based on the weight of the utility fluid, of aromatic and non-aromatic ring compounds. Preferably, the utility fluid comprises aromatics. More preferably, the utility fluid comprises ≥25.0 wt. %, ≥40.0 wt. %, ≥50.0 wt. %, ≥55.0 wt. %, or ≥60.0 wt. % aromatics, based on the weight of the utility fluid.

Typically, the utility fluid comprises one, two, and three ring aromatics. Preferably the utility fluid comprises ≥25.0 wt. %, ≥40.0 wt. %, ≥50.0 wt. %, ≥55.0 wt. %, or ≥60.0 wt. % 2-ring and/or 3-ring aromatics, based on the weight of the utility fluid. The 2-ring and 3-ring aromatics are preferred due to their higher SBN.

The utility fluid can have a true boiling point distribution having an initial boiling point ≥177° C. (350° F.) and a final boiling point ≤566° C. (1050° F.). The utility fluid can have a true boiling point distribution having an initial boiling point ≥177° C. (350° F.) and a final boiling point ≤430° C. (800° F.). True boiling point distributions ("TBP", the distribution at atmospheric pressure) can be determined, e.g., by conventional methods such as the method of ASTM D7500. When the final boiling point is greater than that specified in the standard, the true boiling point distribution can be determined by extrapolation.

Generally, increased non-aromatic content of utility fluids having a relatively low initial boiling point, such as those where ≥10 wt. % of the utility fluid has an atmospheric boiling point <175° C., can lead to tar-utility fluid incompatibility and asphaltene precipitation. Accordingly, the utility fluid can have a true initial boiling point ≥177° C. Likewise, since generally higher SBN molecules are required to avoid incompatibility with high $I_N$ tars and higher boiling point molecules have higher SBN, the utility fluid can have a true final boiling point ≤566° C. (1050° F.). Optionally, the utility fluid can have a true final boiling point >430° C. (800° F.). Such utility fluids have more than the typical aromatic content (≥25.0 wt. % of 2 and 3-ring aromatics, based on the weight of the utility fluid).

The relative amounts of utility fluid and tar stream employed during hydroprocessing are generally in the range of from about 20.0 wt. % to about 95.0 wt. % of the tar stream and from about 5.0 wt. % to about 80.0 wt. % of the utility fluid, based on total weight of utility fluid plus tar stream. For example, the relative amounts of utility fluid and tar stream during hydroprocessing can be in the range of (i) about 20.0 wt. % to about 90.0 wt. % of the tar stream and about 10.0 wt. % to about 80.0 wt. % of the utility fluid or (ii) from about 40.0 wt. % to about 90.0 wt. % of the tar stream and from about 10.0 wt. % to about 60.0 wt. % of the utility fluid. In an embodiment, the utility fluid:tar weight ratio can be ≥0.01, e.g., in the range of 0.05 to 4.0, such as in the range of 0.1 to 3.0 or 0.3 to 1.1. At least a portion of the utility fluid can be combined with at least a portion of the tar stream within the hydroprocessing vessel or hydroprocessing zone, but this is not required, and in one or more embodiments at least a portion of the utility fluid and at least a portion of the tar stream are supplied as separate streams and combined into one feed stream prior to entering (e.g., upstream of) the hydroprocessing stage(s). For example, the tar stream and utility fluid can be combined to produce a feedstock upstream of the hydroprocessing stage, the feedstock comprising, e.g., (i) about 20.0 wt. % to about 90.0 wt. % of the tar stream and about 10.0 wt. % to about 80.0 wt. % of the utility fluid or (ii) from about 40.0 wt. % to about 90.0 wt. % of the tar stream and from about 10.0 wt. % to about 60.0 wt. % of the utility fluid, the weight percents being based on the weight of the feedstock.

In some embodiments, the combined pyrolysis tar and utility fluid has a SBN≥110. Thus, it has been found that there is a beneficial decrease in reactor plugging when hydroprocessing pyrolysis tars having incompatibility number ($I_N$)>80 if, after being combined, the utility fluid and tar mixture has a solubility blending number (SBN)≥110, ≥120, ≥130. Additionally, it has been found that there is a beneficial decrease in reactor plugging when hydroprocessing pyrolysis tars having incompatibility number ($I_N$)>110 if, after being combined, the utility fluid and tar mixture has a solubility blending number (SBN)≥150, ≥155, or ≥160.

Referring again to FIG. 2, the feedstock 212 is then mixed with a treat gas (not shown) comprising molecular hydrogen at mixpoint 213 and the mixture is heated at heat exchanger 214. The ratio of $H_2$:feed is typically 3000 scfb, but may be varied, e.g., from about 2000 scfb to about 3500 scfb or from about 2500-3200 scfb.

The mixed feed can then be heated at a feed pre-heater 216, usually to a temperature from 200° C. to 425° C., and is then fed into the first hydroprocessing zone 218 of at least two hydroprocessing zones. These are shown as being in separate reactors, but they need not be separated in this manner. In some configurations, such as illustrated in FIG. 2, the first hydroprocessing zone 218 will include a catalyst that predominantly promotes a hydrotreating reaction. Such a catalyst can be one that comprises one or more of Mo, Co and Ni, supported on alumina. Exemplary catalysts for use in a hydroprocessing zone, which hydroprocessing can be the first treatment applied to the feedstock tar, are described above. The feed is contacted with the catalyst under catalytic hydroprocessing conditions to produce a first hydroprocessed product (a first hydrotreated product) 220.

The duration of the first hydrotreating step is calculated based on bed voidage and reactor size from the particular liquid mass flux through the first hydroprocessing zone (e.g., ≥1200 lb/hr·ft² (1.6 kg/s·m²)).

The first hydroprocessed product 220 is then optionally mixed with fresh treat gas 221 (in the manner described above) and the combined feed 223 is heated at heat exchanger 222 and/or then introduced into a second hydroprocessing zone 224 of the at least two hydroprocessing zones. A catalyst is used in the second hydroprocessing zone 224 that promotes predominantly cracking reaction, which can be a hydrocracking reaction. Exemplary catalysts for use in the second hydroprocessing zone are described above.

The first hydroprocessed product is contacted with the second catalyst under catalytic hydroprocessing conditions to produce a second hydroprocessed product (a second, cracked product) 226.

The duration of the second hydrotreating step is calculated based on bed voidage and reactor size from the particular liquid mass flux through the second hydroprocessing zone (e.g., ≥1200 lb/hr·ft² (1.6 kg/s·m²)).

The second hydroprocessed product 226 is cooled in exchangers 222 and 214 then withdrawn as a liquid product from separator 228 and recovered as a SATC product 234 and a recycle solvent (utility fluid) 204.

Independently, or in combination with any particular arrangement of the catalysts in the different hydroprocessing zones, the temperature in the first hydroprocessing zone of a Ht-Cr process can range from 200-425° C., or from 250-425° C., or from 300-425° C., or from 350-425° C. The temperature in the first hydroprocessing zone of an Ht-Cr process can range from 300-425° C., or from 350-425° C., or from 300-400° C., or from 350-375° C. The temperature in the second hydrocracking zone of an Ht-Cr process can range from 300-425° C., or from 350-425° C., or from 350-415° C., or from 375-415° C.

One of ordinary skill will appreciate the reverse Cr-Ht configuration could include swapping the type of catalyst and conditions in the first and second hydroprocessing zones. The catalyst for each hydroprocessing zone maybe selected independently of the catalyst used in any other hydroprocessing zone as described above.

Independently, or in combination with any particular arrangement of the catalysts in the different hydroprocessing zones, the temperature in the first hydroprocessing zone of a Cr-Ht process can range from, for example, 375-450° C., or from 375-425° C., or from 400-450° C., or from 400-425° C. The temperature in the second, hydrotreating zone of a Cr-Ht process can range from, for example, 300-400° C., or from 325-400° C., or from 325-375° C., or from 350-375° C.

In any configuration of the process, the hydroprocessing conditions can comprise a pressure of from 800-1600 psig, or from 1000-1400 psig, or from 1000-1200 psig, or from 1100-1600 psig, or from 1100-1300 psig. A pressure around 1200 psig might be used in a process in which a predominantly hydrotreating process is applied first, and a predominantly hydrocracking process is applied second.

In any configuration of the process the catalyst promoting predominantly a hydrotreating reaction can comprise Ni and the pressure in the hydroprocessing zone for predominantly a hydrotreating reaction can be >2000 psig. This adaptation of the process can be used when the tar is one that has high viscosity, e.g., >25,000 cSt @ 50° C., and/or high $I_n$, e.g., ≥110. A Ni-containing catalyst that is useful in a process run under these conditions is a Ni—Co—Mo/Al$_2$O$_3$ catalyst, such as RT-228.

In any configuration of the process, the time of the catalytic contact with the feed under hydroprocessing conditions is calculated based on bed voidage and reactor size from the particular liquid mass flux through the second hydroprocessing zone. For example, in an Ht-Cr configuration, the liquid mass flux in the first hydroprocessing zone can be, e.g., ≥3000 lb/hr·ft² and in the second hydroprocessing zone can be ≥1200 lb/hr·ft². Or, when the process is run in the Cr-Ht configuration, the liquid mass flux in the first hydroprocessing zone can be, e.g., ≥1200 lb/hr·ft² and in the second hydroprocessing zone can be ≥3000 lb/hr·ft².

In any configuration of the process, a tar can comprise (i) ≥10.0 wt. % of molecules having an atmospheric boiling point ≥565° C. that are not asphaltenes and (ii) ≤1.0×10³ ppmw metals. Such a tar can be a pyrolysis tar.

In any configuration of the process, (i) the hydrotreating is conducted continuously in the hydrotreating zone from a first time $t_1$ to a second time $t_2$, $t_2$ being ≥($t_1$+80 days) and (ii) the pressure drop in the hydrotreating zone at the second time is increases ≤10.0% over the pressure drop at the first time.

Figure 3:
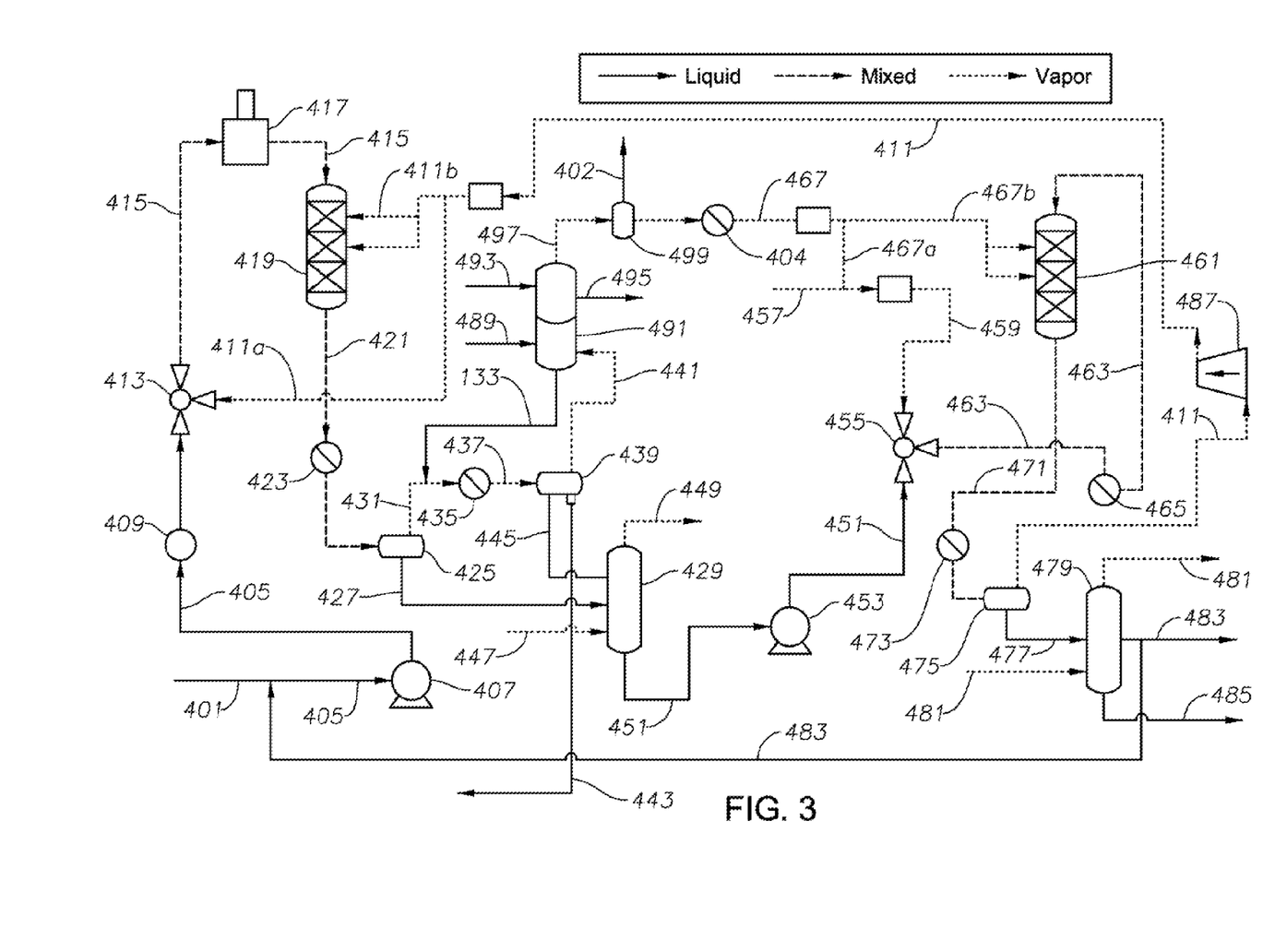
FIG. 3 is an illustration of a third embodiment of a two-hydroprocessing zone process and apparatus.

Referring now to FIG. 3, an embodiment of the two-hydroprocessing zone process is described.

Tar stream 401, the tar being as described above, is mixed with a portion of mid-cut solvent stream 483 and the resultant mixture 405 is pumped by pump 407 and heated through a series of heat exchangers 409 prior to combining with stream 411a, which is a portion of a first recycle gas 411 composed predominantly of hydrogen, at mixer 413. The combined feed 415 is further heated at a preheater 417 before entering a first hydroprocessing zone 419. Another portion 411b of first recycle gas 411, which consists of recycled hydrogen and additional light components, is distributed throughout the length of hydroprocessing zone 419 to manage the hydroprocessing exotherm. The effluent, stream 421, from the first hydroprocessing zone 419 comprises hydroprocessed pyrolysis tar, hydrogen, H$_2$S, NH$_3$, and other light components. The effluent is cooled against a series of exchangers 423 before entering a first vapor liquid separator 425. The bottom liquid product, stream 427, is directed to stripping tower 429. The overhead of the first vapor-liquid separator, stream 431, combines with predominantly water rich stream 433 and is cooled against a series of heat exchangers 435. The cooled effluent stream 437 enters a second vapor-liquid-liquid separator 439, which separates a second recycle gas (stream 441) from sour water (stream 443) and condensed hydrocarbon (stream 445). Stream 445 is directed to stripping tower 429.

Stripping tower 429 operates by injecting a stripping gas (stream 447) in a countercurrent flow of condensed hydrocarbons. The stripping gas removes dissolved gases and light hydrocarbons contained within streams 445 and 427. The overhead product, stream 449, will contain a minor amount of dissolved gases and light hydrocarbons which are carried away while the bottoms product (stream 451) will be free of dissolved gases. Stream 451 is pumped to mixer 455 via pump 453, where stream 451 is contacted by a hydrogen rich vapor (stream 459), comprising (optional) fresh hydrogen (via 457), and a second recycle gas, to support hydrotreating reactions in a second hydroprocessing zone 461. The mixture (stream 463) is heated in a series of heat exchangers (465) before entering the second hydroprocessing zone 461.

Similar to the configuration at the first hydroprocessing zone 419, a portion of the second recycle gas (stream 467) is distributed throughout the reactor to manage the exotherm (467b) and support hydrotreating (467a). The resulting effluent from the second hydroprocessing zone (stream 471), which is a mixture of hydrotreated tar, light hydrocarbons, hydrogen, and $H_2S/NH_3$ is cooled against a series of heat exchangers (473) prior to entering a second vapor-liquid separator 475. The liquid product stream 477 is directed to stabilizing tower 479, where a second stripping gas (stream 481) is added to remove dissolved gases from stream 477. Three products are produced, stream 481 which consists of stripping and dissolved gases, stream 483, which is predominantly composed of mid-range boiling components and known as mid-cut solvent, and stream 485, which represents the heaviest boiling components.

A second circuit is generated for vapors within the process. Make-up hydrogen, which is used to drive the overall hydroprocessing of the tar, is added via stream 457. It combines with a second recycle gas stream 467 to produce a hydrogen enriched vapor stream 459. Following the same logic as above, the vapor travels through the second hydroprocessing zone until it reaches a second vapor liquid separator 475. The vapor overhead stream 411 is compressed through 487 and cascaded back to the first hydroprocessing zone 419 as a first recycle gas stream 411, which is split partially as feed hydrogen to mixer 413 (stream 411a) and partially as distributed quench at various points in the first hydroprocessing zone (stream 411b). The effluent of the first hydroprocessing zone 421 is cooled and condensed, and the vapor phase exits the vapor-liquid-liquid separator 439 in stream 441. This stream, which contains $H_2S$ and $NH_3$ produced in the hydroprocessing chemistry in the first hydroprocessing zone 419, is first contacted against a water wash (stream 489) in contacting tower 491. The overhead enters a secondary contacting region where the vapor is contacted against an amine solution (stream 493) to scrub out remaining $H_2S$. The spent amine (stream 495) is directed to separate recovery facilities. The overhead of the scrubbing tower (stream 497) is partially purged (stream 402) from drum 499 to prevent the buildup of light hydrocarbons. The main portion of the second recycle gas (stream 467) is then cooled in a series of heat exchangers 404, and used to combine with makeup hydrogen (stream 467a) and quench in the second hydroprocessing zone 461.

Figure 4:
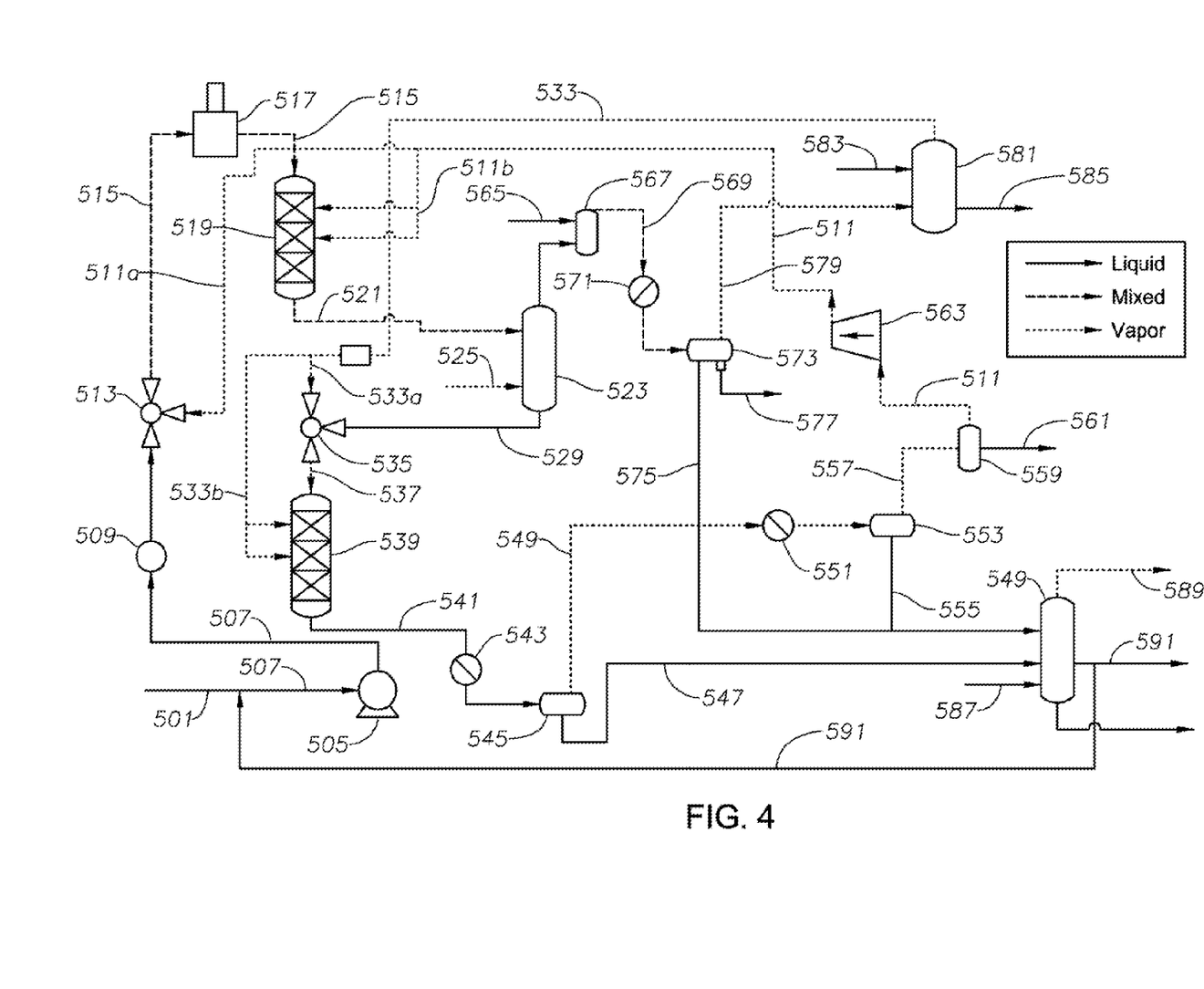
FIG. 4 is an illustration of a fourth embodiment of a two-hydroprocessing zone process and apparatus.

Referring now to FIG. 4, another embodiment of a two-hydroprocessing zone process is described.

Tar stream 501 (the tar being as described above) is mixed with a portion of stream 589, and the mixture 507 is pumped by pump 505 and heated through a series of heat exchangers 509 prior to combining with a first recycle gas, which comprises recycled hydrogen and additional light components and is composed predominantly of hydrogen (stream 511a), at mixer 513. The mixed feed is further heated by a pre-heater 517 before entering a first hydroprocessing zone 519. Another portion of the first recycle gas 511b, is distributed throughout the length of the first hydroprocessing zone 519 to manage the hydroprocessing exotherm. The effluent, stream 521, consists of hydroprocessed tar, hydrogen, $H_2S$, $NH_3$, and other light components. Stream 521 is sent to a high pressure stripping tower 523, where a makeup hydrogen stream 525 is added. Through countercurrent contacting of liquid and vapor, the makeup hydrogen strips light hydrocarbons, $H_2S$, and $NH_3$ from the first hydroprocessing effluent into stream 521. The liquid product, stream 529, is mixed with a portion of a second recycle gas 533a hydrogen in mixpoint 535 to form the feed 537 for a second hydroprocessing zone 539. Similar to the configuration of the first hydroprocessing zone 519, a portion of the hydrogen rich second recycle gas stream 533b is distributed through the second hydroprocessing zone to manage the exotherm associated with hydroprocessing and provide addition hydrogen for conversion. The effluent of the second hydroprocessing zone, stream 541, is cooled across a series of heat exchangers 543 before entering a vapor liquid separator 545. The liquid product, stream 547, is directed to stabilizing tower 549 for final stripping.

The overhead of the vapor-liquid separator 545 (stream 549) is cooled against a series of heat exchangers 551, before entering a second vapor liquid separator 553. The condensed liquid, stream 555, is directed to stabilizing tower 549, while the overhead stream 557 is directed to drum 559. From drum 559, a small purge (stream 561) is enabled to prevent buildup of non-condensable light hydrocarbons, and the majority (stream 511) is compressed via compressor 563 and cascaded back to the first hydroprocessing zone 539. The compressed stream (stream 511) is split into a feed hydrogen stream (stream 511a) and quench (stream 511b) for the first hydroprocessing zone 439.

The overhead of the high pressure stripping tower 523 (stream 527) is contacted with water (stream 565) at drum 567 to manage precipitation of ammonium salts. The mixture stream 569 is cooled against a series of heat exchangers (571) before entering a vapor-liquid-liquid separator 573. Condensable hydrocarbon (stream 575) is directed to the stabilizing tower 549, sour water is removed via stream 577, and the overhead stream 579 is directed to an $H_2S$ scrubber (581). In scrubber 581, an amine solution (stream 583) is contacted with the $H_2S$ rich vapor stream 579 to remove $H_2S$. The liquid effluent (stream 585) is sent offsite for regeneration. The vapor overhead stream 533 is then used as feed (stream 533a) and quench gas for the second hydroprocessing zone 539 (stream 533b).

The liquid product streams 547, 555, and 575 are directed to stabilizing tower 549, where a second stripping gas (stream 587) is added to remove dissolved gases from the streams 547, 555, and 575. Three products are produced, stream 587 which consists of stripping and dissolved gases, stream 589, which is predominantly composed of mid-range boiling components and known as mid-cut solvent, and stream 591, which represents the heaviest boiling components.

EXAMPLES

Example 1—Comparing One-Stage and Two-Stage Processes

SCT having density 1.16 g/cm³ was mixed with a solvent having density 0.94 g/cm³. The combined feed was directed to one and two-stage fixed bed reactors. The one stage reactor was operated at 400° C., 1100 psi (7584 kpa) and a weight hourly space velocity (WHSV) of 0.5 $h^{-1}$. The two-stage reactor was operated at 400° C. for first reactor stage, 370° C. for the second reactor stage, 1100 psi (7584 kpa) and a WHSV of 1.0 $h^{-1}$. Hydrogen to combined feed ratio for both experiments was provided at 3000) scfb. A total liquid product was collected from each reactor and analyzed. The TLP from each reactor was distilled to form a SATC product for analysis. Table 3 indicates analysis of TLP from the one-stage and two-stage experiments. Table 4 indicates analysis of the distilled SATC product from the one-stage and two-stage experiments.

TABLE 3

Comparison of total liquid products (TLP) from a one-hydroprocessing zone process and from a two-hydroprocessing zone process.

|  | One Stage | Two Stage |
|---|---|---|
| Delta API | 9.3 | 10.1 |
| H2 Consumption (SCFB, tar basis excluding solvent) | 1550 | 2235 |
| 1050° F.+ conversion | 46 wt. % | 48 wt. % |
| Sulfur conversion | 89 wt. % | 96 wt. % |

TABLE 4

Comparison of SATC products from a one-hydroprocessing zone process and from a two-hydroprocessing zone process.

|  | One Stage | Two Stage |
|---|---|---|
| Density (g/cm$^3$) | 1.07 | 1.02 |
| Viscosity (cSt) | 49 | 15 |
| Hydrogen content (wt. %) | 7.9 | 9.1 |
| Sulfur content (wt. %) | 0.6 | 0.13 |

Figure 5A:
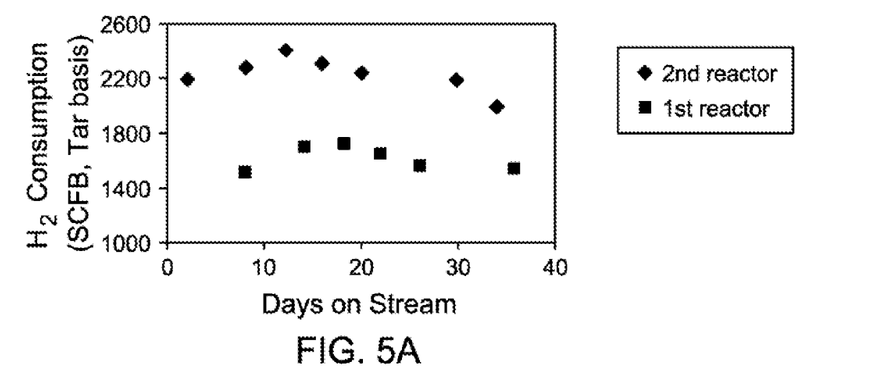
FIG. 5A shows hydrogen consumption in a two hydroprocessing zone process.
Figure 5B:
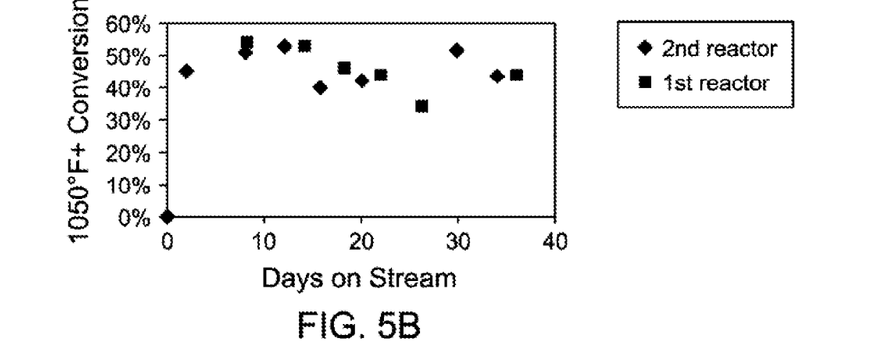
FIG. 5B shows heavy molecule conversion in a two hydroprocessing zone process.
Figure 5C:
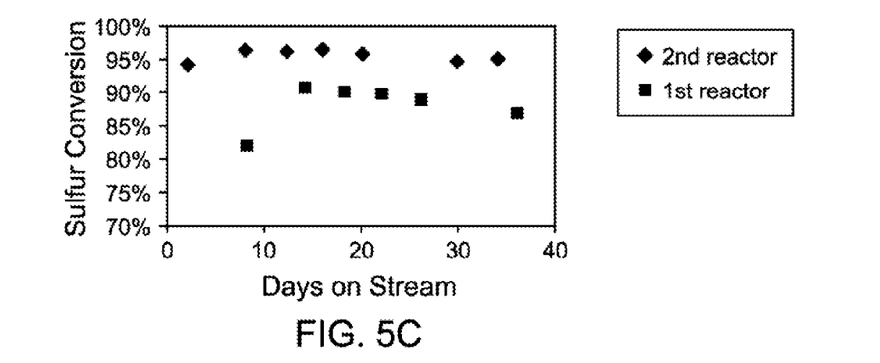
FIG. 5C shows sulfur conversion in a two hydroprocessing zone process.

To better understand the two-stage reactor process, a first total liquid product TLP-1 was collected from the first reaction zone of the two-stage reactor experiment and analyzed. Then TLP-1 was fed to the second reaction zone. A second total liquid product TLP-2 was collected from the second reaction zone effluent and analyzed. FIG. 5A, FIG. 5B, and FIG. 5C indicate hydrogen consumption (FIG. 5A), 1050+ F conversion (FIG. 5B), and sulfur conversion (FIG. 5C) measured for TLP-1 and TLP-2 of the two-stage experiment. It has been observed that the cracking of heavy molecules (1050+ F fraction) does not change between first and second hydroprocessing zones. However, additional hydrogen is consumed in the second hydroprocessing zone and further sulfur conversion occurs, providing a product with lower viscosity and density.

Example 2—Identifying Operating Conditions to Improve Product Quality

An extensive process condition screening test was performed to identify advantageous operating zone conditions for the reaction types explained above so that the target SATC product quality can be achieved for varying tar types without plugging the reactor. Experiments were conducted in a single reaction zone configuration. e.g., a configuration as in FIG. 1. For all experiments, the conditions included a 1-12 to feed ratio 3000 scf of H$_2$ per barrel of feed (feed+ utility fluid) and WHSV of 0.5 hr$^{-1}$. The experiments were conducted by changing only one parameter at a time keeping the remaining conditions the same as in the base case. The adjusted conditions and results of the experiments are contained in Table 6 and Table 7.

The experiments were conducted using two different kinds of tar samples (though both are tar products of a pyrolysis process), representing the endpoints of the spectrum of the characteristics of typical pyrolysis tar products. Tar sample 1 is a high sulfur content, low viscosity tar. Tar sample 2 is a low sulfur content, high viscosity tar. Some of the properties of the Tar sample 1 and Tar sample 2 are listed in Table 5

TABLE 5

Properties of Tar Sample 1 and Tar Sample 2 Tars

|  | Tar sample 1 | Tar sample 2 |
|---|---|---|
| SBN | 145 | 176 |
| I$_N$ | 88 | 110 |
| C$_7$ Insoluble (wt. %) | 17.3 | 43.5 |
| Viscosity (cSt @ 50° C.) | 693 | 29560 |
| Density (g/cm$^3$) | 1.10 | 1.14 |
| S-content (wt. %) | 2.88 | 0.38 |
| H-content (wt. %) | 7.3 | 6.71 |

The Solubility Number (SBN) of Tar sample 2 is higher than of Tar sample 1, and the 11-content of the Tar Sample 2 is lower. A higher SBN with a lower 11-content indicates that the Tar sample 2 has a higher aromaticity. The most drastic differences between the two tar types are in the total asphaltenes amount (C$_7$ insoluble amount) and the viscosity. The Tar sample 2 has 2.5 times more asphaltenes (C$_7$ insolubles) compared to Tar sample 1 and higher asphaltenes content makes the Tar sample Tar sample 2 is also more viscous and dense than Tar sample 1. In addition to higher total asphaltenes content, the Tar sample 2 has a higher insolubility number (I$_N$) indicating the presence of harder to convert asphaltenes.

The two tar samples were each mixed with a model solvent, trimethylbenzene (TMB), adjusting the ratio of tar to solvent to obtain the same concentration of heavy hydrocarbons (i.e. those of the boiling point 1050 F+ fraction) and the same starting feed viscosity. The difference between the two blended feedstocks is thus reduced to differences in the chemical structure of their constituent molecules, e.g., the two samples will differ in aromaticity.

TABLE 6

Effect of Temperature and Pressure on Two Tar Samples

| T (° C.) | P (psi) | 1050 F. + Conversion (wt. %) | 750 F. + Conversion (wt. %) | API | S Conversion (wt. %) |
|---|---|---|---|---|---|
| Tar sample 1 | | | | | |
| 350 | 1037 | 17.9% | 20.5% | 15.1 | 82.2% |
| 400 | 1030 | 63.2% | 49.0% | 17.6 | 95.7% |
| 425 | 1034 | 78.3% | 66.7% | 17.9 | 98.0% |
| 450 | 1029 | 85.8% | 78.1% | 19.4 | 98.4% |
| 400 | 593 | 46.8% | 35.8% | 14.8 | 78.5% |
| 400 | 791 | 67.9% | 53.4% | 17.2 | 95.2% |
| 400 | 1030 | 63.2% | 49.0% | 17.6 | 95.7% |
| 400 | 1185 | 67.7% | 51.9% | 18.3 | 94.1% |
| Tar sample 2 | | | | | |
| 350 | 1016 | 9.3% | 15.9% | 13.7 | 65.8% |
| 400 | 1016 | 55.1% | 41.5% | 16.1 | 89.1% |
| 425 | 1018 | 61.5% | 50.5% | 16.4 | 93.5% |
| 450 | 1023 | 73.1% | 64.7% | 17.0 | 88.6% |
| 400 | 1201 | 54.7% | 41.9% | 16.5 | 88.9% |
| 400 | 1016 | 55.1% | 41.5% | 16.1 | 89.1% |
| 400 | 838 | 54.2% | 41.6% | 15.9 | 87.9% |
| 400 | 627 | 53.1% | 40.7% | 15.0 | 85.4% |

TABLE 7

Effect of Temperature and Pressure on Hydrogen Consumption

| T (° C.) | P (psi) | Hydrogen Consumption (scf H2/barrel of Tar) | | | |
|---|---|---|---|---|---|
| | | Lights | H$_2$S | Liquid | Total |
| Tar sample 1 | | | | | |
| 350 | 1037 | 0 | 98 | 819 | 917 |
| 400 | 1030 | 75 | 108 | 826 | 1009 |
| 425 | 1034 | 89 | 117 | 692 | 897 |
| 450 | 1029 | 285 | 117 | 217 | 619 |
| 400 | 593 | 27 | 94 | 490 | 611 |
| 400 | 791 | 53 | 111 | 793 | 957 |
| 400 | 1030 | 73 | 112 | 869 | 1054 |
| 400 | 1185 | 85 | 111 | 958 | 1154 |
| Tar sample 2 | | | | | |
| 350 | 1016 | 10 | 11 | 717 | 738 |
| 400 | 1016 | 78 | 15 | 825 | 917 |
| 425 | 1018 | 114 | 15 | 720 | 850 |
| 450 | 1023 | 191 | 14 | 418 | 623 |
| 400 | 1201 | 74 | 15 | 924 | 1012 |
| 400 | 1016 | 78 | 15 | 825 | 917 |
| 400 | 838 | 82 | 15 | 725 | 821 |
| 400 | 627 | 90 | 14 | 527 | 631 |

Referring to Tables 6 and 7, the extent of the conversion and H$_2$ consumption levels were significantly different at the same condition due to the differences in aromaticity between the two tar samples. As the temperature was increased, the conversion of heavier tar molecule fractions, mostly aromatic, with boiling points higher than 750° F. (399° C., "750 F+") and higher than 1050° F. (565° C., "1050 F+") were increased. This observation indicated the reactor temperature should preferably be equal or higher than 400° C. when notable 1050 F+ conversion levels are desired.

Additionally, it was observed that the % sulfur conversion was higher than conversion of 1050 F+ fraction indicating the sulfur converted more readily compared to 1050 F+ molecules. The comparison of 1050 F+ and sulfur conversion at 350° C. reveals an important detail about the characteristics of sulfur-containing molecules in the feed Even though the 1050 F+ conversion levels were very low (9 wt % for Tar sample 2 and 18 wt. % for Tar sample 1), most of the sulfur was already converted (66 wt. % for Tar sample 2 and 82% sulfur conversion for Tar sample 1). Accordingly, the results indicate the presence of at least two different types of sulfur containing species—one with lower dissociation activation energy and the other fused in higher molecular weight poly-aromatic aromatic structures which can be converted at higher temperatures.

A SATC process typically accomplishes upgrading tar to a product with low density (e.g., about 1.0 or less) and low viscosity (e.g., about 20 cSt @ 50° C. or less) and at the same time consuming the minimum amount of hydrogen. Translated into measured experimental parameters, this goal means highest 1050 F+ conversion and lowest H$_2$ consumption with highest aromaticity. Trend-wise, increasing the temperature may seem like the right thing to do, but the reaction rate of undesired side reactions such as coke formation, over-hydrogenation leading to asphaltenes precipitation, excessive cracking which resulting in cracking of midsize aromatic molecules (molecules with ring numbers around 4) and formation of light gas (C1-C3 olefins), also increase at higher temperatures.

The conversion of 1050 F+ molecules appeared to approach a plateau at temperatures higher than 425° C. However, it was evident from the increased 750 F+ conversion levels that the rate of thermal cracking reactions was increasing as the reaction temperature was increased. The extent of cracking reactions is still high at higher temperatures (<425° C.) and intermediate cracking products are formed. At favorable conditions, these intermediate radicals are cured by hydrogenation on a hydrotreating catalyst surface (typically. Ni—Mo or Co—Mo supported on γ-alumina). Since the exothermic hydrogenation reactions are hindered at higher temperatures, these intermediate radicals cannot be hydrogenated fast enough. In addition to thermal cracking reactions, the addition and polymerization reactions of these radicals take place at higher temperatures. Thus, the net 1050 F+ conversion seems to slow down as the temperature is increased. Moreover, these thermal cracking products in the form of radicals can continue to polymerize with increased time and temperature (catalyzed by acidic sites). Then they act as coke precursors and eventually they can plug a reactor.

The total H$_2$ consumption is broken into parts depending on the source of consumption from different reactions as shown in Table 7. Hydrogen in the feed is used for 1) desulfurization reactions to form H$_2$S; 2) hydrogenation of C—C bonds broken due to thermal cracking; 3) hydrogenation of aromatic compound leading to ring saturation; and 4) production of light gas (C1-C3 olefins). The H$_2$ consumed by the liquid products is determined by using the H weight % difference of the tar feed and the total liquid product (TLP) and this value includes the H$_2$ consumed by reactions 2 and 3 listed above.

H$_2$ consumption levels at 350° C. and 400° C. are compared. Despite the significant difference in the 1050 F+ conversion levels between 350° C. and 400° C. the H$_2$ consumption levels at 350° C. and 400° C. are very close as shown in Table 7. Higher hydrogen consumption values at lower temperatures with minimum levels of heavy fraction (1050 F+) conversion indicates increased H$_2$ consumption by increased rate of hydrogenation reactions resulting in ring saturation.

As the rate of thermal cracking reactions increased with temperature, the extent of light gas production such as methane and ethane was also increased. The H$_2$ consumption levels for both tar types at 450° C. were significantly higher than the values at lower temperatures. Thus, the reaction temperature for the SATC process is preferably kept at moderate levels to prevent the loss of more valuable aromatic liquids via severe cracking reactions to form light gases.

The impact of the total reactor pressure on performance parameters is also shown in Table 6 and Table 7. Minor improvements were observed in conversion levels as the reactor pressure was increased for both tar types. More importantly, the total hydrogen consumption was strongly dependent on the reactor pressure and the total consumption almost doubled as the pressure was increased from 600 to 1200) psig. It is also important to note that increased H$_2$ was mostly consumed towards the hydrogenation of aromatics in the TLP (evident from minor changes in the 1050 F+ conversion). As the H-content of the product is increased its density will also decrease as a result of ring-saturation.

The above discussed results indicate the process conditions can be adjusted based on the characteristics of the tar to achieve the desired product quality. In light of the above findings, based on the effect of reaction temperature and pressure on the product quality, two different reactor configurations are used to accomplish the goal of obtaining on-spec SATC product without experiencing premature reactor plugging. In both cases, two reactors in series are utilized in order to provide a flexible process that enables the independent control of catalyst selection, temperature, pressure, H$_2$ feed ratio and feed rate and composition of the hydrogen feed, if needed Reaction rates and yields towards various products in tar upgrading are strongly dependent on process conditions. As reaction rates for thermal cracking and hydrogenation are increased in different directions of temperature change. Thus, the thermal cracking and hydrogenation are decoupled by using two reaction stages.

Example 3

In the present example, a configuration suited for upgrading easier to treat tars (relative to the range of tars tested) such as those having I$_N$<105 and viscosity <15,000 cSt (50° C.). e.g., those having lower aromaticity. The purpose of the first reactor cracking configuration is to convert a significant portion of the asphaltenes (1050 F+) so that the I$_N$ number is decreased to prevent incompatibility in the second reactor. In the first reactor, the temperature is relatively higher than the second reactor to increase the reaction rate for thermal cracking and the optimum temperature was found to be in the range of 400-425° C. to achieve notable conversion levels (50%). Then, the second reactor hydrogenation configuration performs a touch-up step to hydrogenate aromatic rings to decrease the product density. Since hydrogenation is favored at lower temperatures, the second reactor is operated between 350 and 375° C. In this configuration, a conventional hydrotreating catalyst may be preferred in both reactors (over selecting a hydrocracking catalyst in first reactor) from the perspective of lower cost, and experience in operation.

Example 4

In this example, a configuration suited for upgrading harder to treat tars (relative to the range of tars tested) such as those having I$_N$≥100 and viscosity ≥10.000 cSt (50° C.), e.g., those having higher aromaticity. A first hydrotreating reactor provides partial hydrogenation of the heavy molecules (1050 F+) in the feed. Since the hydrogenation is easier on the less substituted rings of a highly aromatic structure, it is possible to partially hydrogenate the heavy molecules at higher mass flux rates and lower temperatures. As shown in Example 2, it is possible to effectively hydrogenate the hard to treat aromatic structures by using a conventional and low cost hydrotreating catalyst such as CoMo/Al$_2$O$_3$.

Since hydrogenated bonds are weaker (than aromatic bonds), the cracking can be performed in the following reactor at slightly higher temperatures. The preferred catalyst for the second reactor is a hydrocracking catalyst and the hydrocracking catalysts do not demand as high temperatures for thermal cracking. Thus, the second reactor can be operated at, for example, 380-415° C. As a result, the viscosity and density of the SATC product can be significantly reduced via hydrocracking assisted by a modest hydrogenation pre-treatment.

For both Example 3 and Example 4, the mass flux is preferably kept high enough, preferably higher than the typical value of 1200 [lb/hr-ft$^2$], to prevent incompatibility and coke formation. In addition, the reactor pressure is preferably selected to maintain a feasible hydrogenation reaction rate. As previously explained, the hydrogen consumption levels increase considerably as the reactor pressure is increased. However, higher pressure operation also brings higher operational cost, higher material cost for larger equipment and reactor size and higher levels of protection for safety. Thus, reactor pressure levels of 1000-1250 psig will provide sufficient reaction rates for most cases as a safer and more economical option. However, for some difficult to process tars, it may be advantageous to perform the hydrotreating reaction using a N$_1$-containing catalyst and reactor pressure ≥2000 psig.

The description in this application is intended to be illustrative and not limiting of the invention. One in the skill of the art will recognize that variation in materials and methods used in the invention and variation of embodiments of the invention described herein are possible without departing from the invention. It is to be understood that some embodiments of the invention might not exhibit all of the advantages of the invention or achieve every object of the invention.

What is claimed is:

1. A hydrocarbon conversion process, comprising:
   (a) providing a feedstock comprising:
      ≥10.0 wt. % of pyrolysis tar hydrocarbon based on the weight of the feedstock, the pyrolysis tar hydrocarbon having a I$_N$≥100 and viscosity measured at 50° C. of ≥10,000 cSt, and
      a utility fluid comprising aromatic hydrocarbons and having an ASTM D86 10% distillation point >60° C. and a 90% distillation point <425° C.;
   (b) hydroprocessing the feedstock in a first hydroprocessing zone in the presence of a first treat gas comprising molecular hydrogen under first catalytic hydroprocessing conditions to produce a first hydroprocessed product having a vapor phase and a liquid phase;
   (c) separating a vapor phase product and a liquid phase product from the first hydroprocessed product, wherein the vapor phase product comprises hydrogen sulfide and molecular hydrogen;
   (d) hydroprocessing the liquid phase product in a second hydroprocessing zone in the presence of a second treat gas comprising molecular hydrogen under second catalytic hydroprocessing conditions to produce a second hydroprocessed product, wherein:
      the first catalytic hydroprocessing conditions are such that in the first hydroprocessing zone a catalyst is used that promotes a hydrotreating reaction over a hydrocracking reaction at the same reaction conditions, and
      the second catalytic hydroprocessing conditions are such that in the second hydroprocessing zone a catalyst is used that promotes a hydrocracking reaction over a hydrotreating reaction at the same reaction conditions; and
   (e) contacting the vapor phase product with an amine solution to remove at least a portion of the hydrogen sulfide to produce a spent amine stream and a gas effluent comprising the molecular hydrogen.

2. The process of claim 1, in which the catalyst in the first hydroprocessing zone comprises Mo, Co, or Ni supported on alumina; Pt—Pd/Al$_2$O$_3$—SiO$_2$; Ni—W/Al$_2$O$_3$; Ni—Mo/Al$_2$O$_3$; Fe or Fe—Mo supported on a non-acidic support; or Mo supported on a non-acidic support; and the catalyst in the second hydroprocessing zone comprises a zeolite or Co, Mo, P, Ni or Pd supported on amorphous Al$_2$O$_3$ and/or amorphous SiO$_2$ and/or a zeolite.

3. The process of claim 1, in which the catalyst in the first hydroprocessing zone comprises Ni—Co—Mo/Al$_2$O$_3$ and the catalyst in the second hydroprocessing zone comprises Co—Mo/Al$_2$O$_3$.

4. The process of claim 1, in which the temperature in the first hydroprocessing zone ranges from 200-425° C. and the temperature in the second hydroprocessing zone ranges from 350-425° C.

5. The process of claim 1, in which the pyrolysis tar hydrocarbon has an $I_N \geq 105$, a viscosity $\geq 15,000$ cSt measured at 50° C., $\geq 10.0$ wt. % of molecules having an atmospheric boiling point $\geq 565°$ C. that are not asphaltenes, and $\leq 1.0 \times 10^3$ ppmw metals.

6. The process of claim 1, in which the hydroprocessing conditions within the first hydroprocessing zone and the second hydroprocessing zone comprise a pressure of 800-1800 psig.

7. The process of claim 1, in which the weight hourly space velocity (WHSV) of the feedstock through the first hydroprocessing zone and the second hydroprocessing zone is from 0.5 $hr^{-1}$ to 4.0 $hr^{-1}$.

8. The process of claim 1, in which the utility fluid comprises $\geq 25\%$ by weight of ring aromatics and the utility fluid has a SBN of $\geq 100$.

9. The process of claim 1, wherein (i) the hydroprocessing is conducted continuously in the first and second hydroprocessing zones from a first time $t_1$ to a second time $t_2$, $t_2$ being $\geq (t_1 + 80$ days) and (ii) the pressure drop in either hydroprocessing zone at the second time is increased $\leq 10.0\%$ over the pressure drop at the first time.

10. The process of claim 1, wherein the catalyst in the first hydroprocessing zone promotes the hydrotreating reaction at a reaction rate that is $\geq 1.1$ times a reaction rate of a hydrocracking reaction at the same reaction conditions, and wherein the catalyst in the second hydroprocessing zone promotes the hydrocracking reaction at a reaction rate that is $\geq 1.1$ times a reaction rate of a hydrotreating reaction at the same reaction conditions.

11. The process of claim 1, wherein the catalyst in the first hydroprocessing zone promotes the hydrotreating reaction at a reaction rate that is $\geq 2$ times a reaction rate of a hydrocracking reaction at the same reaction conditions, and wherein the catalyst in the second hydroprocessing zone promotes the hydrocracking reaction at a reaction rate that is $\geq 2$ times a reaction rate of a hydrotreating reaction at the same reaction conditions.

12. The process of claim 1, wherein the catalyst in the first hydroprocessing zone promotes the hydrotreating reaction at a reaction rate that is $\geq 5$ times a reaction rate of a hydrocracking reaction at the same reaction conditions, and wherein the catalyst in the second hydroprocessing zone promotes the hydrocracking reaction at a reaction rate that is $\geq 5$ times a reaction rate of a hydrotreating reaction at the same reaction conditions.

13. The process of claim 1, further comprising contacting the vapor phase product with water to remove a first portion of the hydrogen sulfide to produce a sour water and a first hydrogen sulfide lean vapor phase product, wherein the first hydrogen sulfide lean vapor phase product is contacted with the amine solution to remove a second portion of the hydrogen sulfide.

14. The process of claim 1, further comprising contacting the liquid phase product with a stripping gas to form a stripped product, wherein the stripped product is hydroprocessed in the second hydroprocessing zone.

15. A hydrocarbon conversion process, comprising:
(a) providing a feedstock comprising:
$\geq 10.0$ wt. % of pyrolysis tar hydrocarbon based on the weight of the feedstock, the pyrolysis tar hydrocarbon having a $I_N < 105$ and viscosity measured at 50° C. of <15,000 cSt, and
a utility fluid comprising aromatic hydrocarbons and having an ASTM D86 10% distillation point >60° C. and a 90% distillation point <425° C.;
(b) hydroprocessing the feedstock in a first hydroprocessing zone in the presence of a first treat gas comprising molecular hydrogen under first catalytic hydroprocessing conditions to produce a first hydroprocessed product having a vapor phase and a liquid phase; and
(c) hydroprocessing at least a portion of the first hydroprocessed product in a second hydroprocessing zone in the presence of a second treat gas comprising molecular hydrogen under second catalytic hydroprocessing conditions to produce a second hydroprocessed product, wherein:
the first catalytic hydroprocessing conditions are such that in the first hydroprocessing zone a catalyst is used that promotes a hydrocracking reaction over a hydrotreating reaction at the same reaction conditions, and
the second catalytic hydroprocessing conditions are such that in the second hydroprocessing zone a catalyst is used that promotes a hydrotreating reaction over a hydrocracking reaction at the same reaction conditions.

16. The process of claim 15, in which the catalyst in the first hydroprocessing zone comprises a zeolite or Co, Mo, P, Ni, or Pd supported on amorphous alumina and/or amorphous $SiO_2$ and/or a zeolite; and the catalyst in the second hydroprocessing zone comprises Mo, Co, or Ni supported on alumina; Pt—Pd/$Al_2O_3$—$SiO_2$; Ni—W/$Al_2O_3$; Ni—Mo/$Al_2O_3$; Fe or Fe—Mo supported on a non-acidic support; or Mo supported on a non-acidic support.

17. The process of claim 15, in which the catalyst in the first hydroprocessing zone comprises Co—Mo/$Al_2O_3$ and the catalyst in the second hydroprocessing zone comprises Ni—Co—Mo/$Al_2O_3$.

18. The process of claim 15, in which the pyrolysis tar hydrocarbon has an $I_N < 100$ and viscosity <10,000 cSt measured at 50° C.

19. The process of claim 15, in which the temperature in the first hydroprocessing zone ranges from 350-425° C. and the temperature in the second hydroprocessing zone ranges from 200-415° C.

20. The process of claim 15, in which the hydroprocessing conditions within the first hydroprocessing zone and the second hydroprocessing zone comprise a pressure of 800-1800 psig.

21. The process of claim 15, wherein (i) the hydroprocessing is conducted continuously in the first and second hydroprocessing zones from a first time $t_1$ to a second time $t_2$, $t_2$ being $\geq (t_1 + 80$ days) and (ii) the pressure drop in either hydroprocessing zone at the second time is increased $\leq 10.0\%$ over the pressure drop at the first time.

22. The process of claim 15, further comprising:
separating a vapor phase product and a liquid phase product from the first hydroprocessed product, wherein the vapor phase product comprises hydrogen sulfide and molecular hydrogen, and wherein the liquid phase product is hydroprocessed in the second hydroprocessing zone to produce the second hydroprocessed product; and
contacting the vapor phase product with an amine solution to remove at least a portion of the hydrogen sulfide to produce a spent amine stream and a gas effluent comprising the molecular hydrogen.

23. The process of claim 22, further comprising:
contacting the vapor phase product with water to remove a first portion of the hydrogen sulfide to produce a sour water and a first hydrogen sulfide lean vapor phase product, wherein the first hydrogen lean vapor phase product is contacted with the amine solution to remove a second portion of the hydrogen sulfide; and contacting the liquid phase product with a stripping gas to form a stripped product, wherein the stripped product is hydroprocessed in the second hydroprocessing zone.

24. A hydrocarbon conversion process, comprising:
(a) providing a feedstock comprising:
  ≥10.0 wt. % pyrolysis tar hydrocarbon based on the weight of the feedstock, the pyrolysis tar hydrocarbon having a $I_N$<105 and viscosity measured at 50° C. of <15,000 cSt, and
  a utility fluid comprising aromatic hydrocarbons and having an ASTM D86 10% distillation point >60° C. and a 90% distillation point <425° C.; and
(b) processing the feedstock in at least two processing zones to produce a processed tar, wherein
  (i) the processing of the first processing zone includes converting at least a portion of the pyrolysis tar hydrocarbon,
  (ii) the processing of the second processing zone includes converting at least a portion of the pyrolysis tar hydrocarbon in the presence of molecular hydrogen and at least one hydroprocessing catalyst,
  (iii) the conversion of the first processing zone is carried out under hydroprocessing conditions that promote cracking over hydrotreating under the same reaction conditions, and the conversion of the second processing zone is carried out under hydroprocessing conditions that promote catalytic hydrotreating over cracking under the same reaction conditions, and
  (iv) the processing in the first processing zone is carried out before the processing in the second processing zone;
(c) separating a vapor phase product and a liquid phase product from an effluent recovered from the first processing zone, wherein the liquid phase product is processed in the second processing zone to produce the processed tar, and wherein the vapor phase product comprises hydrogen sulfide and molecular hydrogen; and
(d) contacting the vapor phase product with an amine solution to remove at least a portion of the hydrogen sulfide to produce a spent amine stream and a gas effluent comprising the molecular hydrogen.

25. The process of claim 24, further comprising contacting the liquid phase product with a stripping gas to form a stripped product, wherein the stripped product is processed in the second processing zone.

* * * * *